United States Patent Office 3,426,782
Patented Feb. 11, 1969

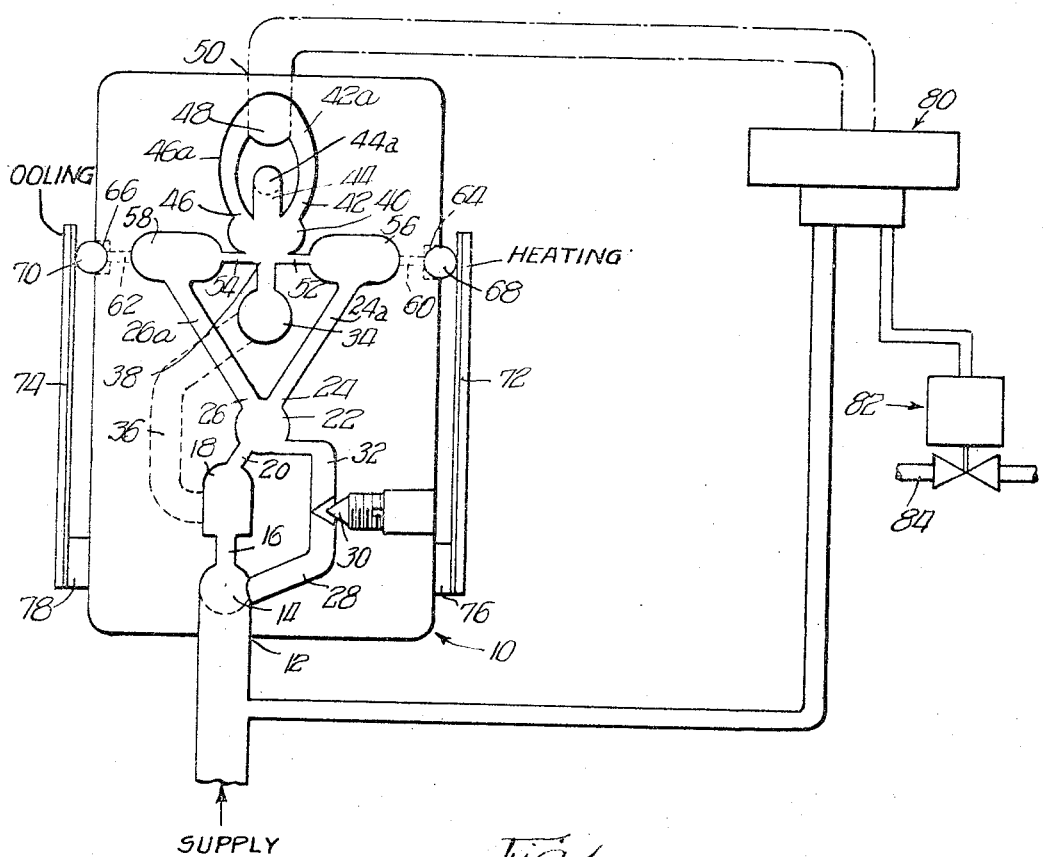
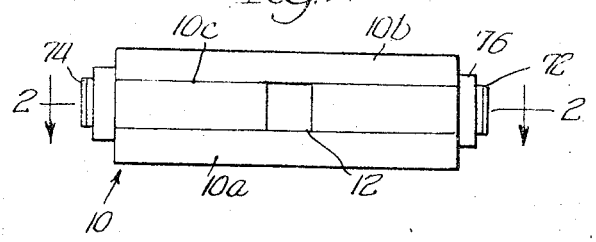

3,426,782
FLUID CONTROLLING UNIT
David H. Thorburn, Oak Park, Ill., assignor to The Powers Regulator Company, Skokie, Ill., a corporation of Illinois
Filed Jan. 7, 1966, Ser. No. 519,204
U.S. Cl. 137—81.5          9 Claims
Int. Cl. F15c 1/14, 3/09; G05d 23/275

ABSTRACT OF THE DISCLOSURE

A fluid amplifier for providing signals proportional to sensed temperature conditions, selectively operable during both heating and cooling cycles. An inlet port is selectively connected to high and low pressure sources, the low pressure being used during heating and the high during cooling. A first orifice normally projects a first stream into a second orifice. Adjustable deflector means are provided to deflect the first stream into a third orifice when the high pressure source is used. A fourth orifice, also connected to a supply, provides a signal stream which normally exhausts to atmosphere, but which may be selectively switched to either of two signal orifices. During the heating cycle the first stream, which is in the second orifice, is directed against the signal stream by a second deflector means to deflect the signal stream into one of the signal orifices. During cooling the first stream, which has been switched to the third orifice, is directed by a third deflector means against the signal stream to switch it into the other signal orifice. Temperature responsive means are provided for each of the second and third deflector means to vary the momentum of the first stream in a manner proportional to the sensed temperature. Thus, the signal stream is deflected from atmosphere to one of the signal orifices in a manner which is likewise proportional to the temperature.

---

This invention pertains to a condition control unit and in particular a control unit utilized for regulating a sensed condition such as temperature.

In the past few years there have been developed what are commonly referred to as "solid state" fluid amplifiers. These devices are characterized in that a main fluid stream is selectively directed to and received by a plurality of orifices, with each particular orifice communicating with a work element or exhausting to atmosphere. By means of the selection between the receiving orifices it is possible to utilize the fluid amplifier for selectively actuating work elements.

In these solid state amplifiers, the direction of the main stream is controlled by means of side jets or streams which impinge on the main stream substantially transverse thereto so as to deflect or control the direction of the main stream. A distinct advantage of the solid state amplifiers is the minimum of or lack of moving parts and the ability to provide substantially the entire function in a device of substantially small size.

The subject invention relates to the application of solid state devices to control systems such as heating and cooling air-conditioning systems. Heretofore such systems have utilized bellows or other movable wall type constructions which are relatively complex and cumbersome in size as compared to solid state devices. The subject invention permits the application of solid state devices to air conditioning, heating and cooling systems.

The subject invention further provides a solid state device which can automatically switch between direct acting and reverse acting and thus provide control for both cooling cycle and the heating cycle of the system. This feature permits the use of a single control element such as a valve whether the system is heating or cooling.

Briefly, the invention may be described as a solid state device comprising an inlet port adapted to be selectively connected to first and second sources of pressurized fluid, one of which is at a higher pressure than the other. Connected to the inlet port is a first orifice which is adapted to discharge a first stream of pressurized fluid selectively into second and third orifices. The fluid amplifier further includes means for receiving the pressurized fluid at or near the inlet port and directing a second stream on said first stream in a direction tending to cause said first stream to deflect from said second orifice to said third orifice. The means for directing the second stream reduces the pressure of said pressurized fluid to an extent that, of the two sources of pressurized fluid, only the higher pressure source is sufficient to deflect the first stream from the second orifice to the third orifice.

In the more detailed aspects of the invention, the first fluid amplifier as described above is associated with a second fluid amplifier of a similar type in which a stream of fluid is adapted to be selectively directed between or in variable proportion between a plurality of orifices. The direction of the main stream in the second fluid amplifier is controlled by means of the main stream received in the second and third orifices described above. The main stream received in the second and third orifices is subjected to the control of a condition sensing element such as a bimetallic blade or the like which is adapted to bleed or not bleed the stream to atmosphere depending on the condition sensed. Under certain conditions, as will be described herein, the stream received in the second and third orifices is used as a deflecting stream on the main stream in the second amplifier.

The main stream in the second amplifier is adapted to be communicated under certain conditions to a relay which is in turn connected to a control element such as a valve. In an air conditioning system the valve would control the flow of hot water in the case of heating and the flow of cold water in the case of cooling.

It is a foremost feature and object of the invention to provide a thermostatic unit which utilizes solid state amplifiers.

A still further feature and object of the invention resides in the provision of a thermostatic unit composed of a solid state amplifier which automatically switches between heating and cooling control functions.

A still further feature and object of the invention resides in the provision of a thermostatic control unit adapted to be utilized in air conditioning systems which utilizes a novel combination of solid state amplifying units and thermal sensing units such as bimetallic elements.

A still further feature and object of the invention resides in the provision of a system utilizing the combination of a thermostatic control unit composed of solid state amplifying units and a control unit for regulating the flow of the temperature controlling medium.

The above features and objects of the invention and others will be apparent upon reading of the specification with reference to the following drawing.

In the drawing:

FIGURE 1 comprises a schematic illustration of an end view of the inventive thermostate unit.

FIGURE 2 is a sectional view taken along the line 2—2 in FIGURE 1.

It is to be understood that while the invention will be described as it might be used in an air conditioning system, such is by way of example and is not to be considered a limitation. It will be apparent that the invention may be utilized in many types of control systems of which an air conditioning system is only one. It will be further understood that while the invention will be described as being pneumatically operated, such is again exemplary, and that the invention may be operated by an appropriate fluid.

The subject invention may be constructed of any suitable materials and to any suitable size that will perform in the manner intended. It will be apparent in many instances the components of the system could advantageously be constructed of metals although the invention does not depend and does not limit it to such.

Referring now to the drawing, there is shown a schematic illustration of the thermostatic unit and the system in which it is used. The thermostatic unit is generally denoted by the numeral 10 and during its operation is selectively connected to two sources (not shown) of pressurized fluid which will hereinafter be designated as supply pressure. One of the two sources is higher than the other and it will be assumed that the higher is utilized during the cooling cycle of the air conditioning system whereas the lower of the two pressures is adapted to be utilized during the heating cycle of the system. It will be noted that two supply pressures is the normal arrangement for conventional air conditioning systems which include both heating and cooling functions. For purposes of illustration, the systetm shown will have a supply pressure of 18 p.s.i. during the heating cycle and the supply pressure during the cooling function will be 22 p.s.i.

As shown in FIGURE 1, one preferred embodiment of the thermostatic unit 10 consists of a wafer-like construction consisting of the cover members 10a and 10b between which is sandwiched the amplifying unit 10c. The cover units 10a and 10b serve to confine the air within the passages provided in the amplifying unit 10c. The covers 10a and 10b may be secured in place by any suitable means such as bolts, rivets, etc. (not shown). The thermostatic unit is provided with an inlet port 12 which is connected by suitable means (not shown) to the sources of supply pressure. The inlet port communicates with a chamber 14 which in turn terminates in a restricted passage 16. The restricted passage 16 opens into a second chamber 18 which communicates with an orifice 20. The orifice 20 opens to a third chamber 22 which, in addition to the orifice 20, is provided with the orifices 24 and 26. In the preferred embodiment the orifice 24 is substantially aligned with the orifice 20 so as to normally receive the stream of air issuing therefrom. The orifice 26 is angularly disposed with respect to the line of coaxiality extending between the orifices 20 and 24 as can be seen from FIGURE 2. As a result, unless otherwise deflected, the stream of air flowing from the orifice 20 is received in the orifice 24 and not into the orifice 26.

The chamber 14 is further provided with the branch passage 28 in whitch is disposed a variable restriction such as the needle valve 30, as shown in FIGURE 2. The passage 28 receives the supply pressure connected to the inlet port 12 with the supply pressure being reduced as it passes the needle valve 30 into the passage 32. The passage 32 is connected to the chamber 22 and is adapted to direct a stream of air into the chamber 22 in a direction substantially transverse to the direction of the stream of air issuing from the orifice 20. In the preferred embodiment of the thermostatic unit 10 the needle valve 30 is adjusted so that the supply pressure in the passage 28 is reduced so that the stream issuing from the passage 32 into the chamber 22 has an effect on the stream issuing from the orifice 20 only when the higher of the two supply pressures is in use. Thus, in the example previously given, when the thermostatic unit is connected to the 22 p.s.i. supply pressure the air stream issuing from the passage 32 will impinge upon the stream issuing from the orifice 20 and cause it to deflect from the orifice 24 to the orifice 26. When the thermostatic unit 10 is connected to the 18 p.s.i. source of supply pressure the pressure will be reduced by the needle valve 30 to such an extent that it will not deflect the stream of air issuing from the orifice 20. Under that condition, the stream of air issuing from the orifice 20 will be directed into and received by the orifice 24.

The chamber 18 is additionally connected to a chamber 34 by means of a passage 36 so that the pressure within the chamber 18 is communicated to the chamber 34. It will be noted that the pressure within the chamber 18 and in turn the chamber 34 will be less than the supply pressure as a result of the restriction 16. The chamber 34 terminates in an orifice 38 which in turn communicates with a chamber 40. The chamber 40 is provided with three orifices 42, 44 and 46. Orifices 42 and 46 communicate with passages 42a and 46a which terminate in the chamber 48. The chamber 48 communicates with an outlet or control pressure port 50 which is adapted to be connected with other components utilized in the system as will be described later on.

The orifice 44, in the preferred embodiment, is open to atmosphere through the port 44a and is coaxially aligned with the orifice 38.

The chamber 40 is also provided with the passages 52 and 54 which communicate with the chambers 56 and 58 respectively. The chambers 56 and 58 in turn are connected to the orifices 24 and 26, respectively, by means of the passages 24a and 26a. Thus when the stream of air issuing from the orifice 20 is received in the orifice 24, such stream flows through the passage 24a and into the chamber 56. Likewise when the stream is deflected into the orifice 26 such stream is directed into the chamber 58. Each of the chambers 56 and 58 is provided with a bleed passage 60 and 62 which is open to atmosphere. The bleed passages 60 and 62 are provided with the counterbored receptacle portions 64 and 66 for receiving the ball valve members 68 and 70 respectively. The ball valve members are adapted to be seated on the periphery of the end of the passages 60 and 62 and when so seated prevent the escape of the air to atmosphere.

A bimetallic member 72 and 74 is mounted on each side of the thermostatic unit as shown in FIGURE 2 by means of a suitable mounting device such as the posts 76 and 78. The bimetallic elements are temperature sensitive and are adapted to engage the associated ball valve members 68 and 70 and to normally bias the same toward seating engagement with the end of the associated passage 60 and 62.

If the stream of air issuing from the orifice 20 is directed into the orifice 24 and in turn into the chamber 56, a stream of air will be directed through the passage 52. If the ball valve member 68 is in a wide open position whereby the chamber 56 is open to atmosphere there will be substantially little or no air stream passing through the passage 52. However, if the ball valve member 68 is in its seated or in a closely spaced relationship with the end of the passage 60, substantially the entire air stream flowing into the chamber 56 will be forced into the passage 52. The magnitude of the air stream in the passage 52 will thus be proportional to the degree of closure of the ball valve member 68. The air stream issuing from the passage 52 will be substantially transverse to the direction of the air stream flowing from the orifice 38 and will tend to deflect the same toward the left. If the air stream flowing from the passage 52 is of sufficient magnitude the air stream issuing from the orifice 38 will be completely deflected into the orifice 46 so that all of the same is directed through the outlet port 50. As stated previously, the air stream issuing from the orifice 20 will be received in the orifice 24 and in turn chamber 56 during the heating cycle of the system. If the system is being used for cooling then the air stream from the orifice 20 will be received in the chamber 58 which in turn will operate in a manner similar to that previously described except that the air stream issuing from the passage 54 will deflect the stream issuing from the orifice 38 toward the right into the orifice 42 and, in turn, under the proper conditions the stream will be directed to the outlet port 50.

The thermostatic unit 10 as mentioned previously in a preferred embodiment is connected to an amplifying relay which is operated by means of supply pressure, generally the same as that supplied to the unit itself. The amplifying relay 80 may be of any suitable type which is actuated by means of a pressure signal and upon actuation is designed to emit a pneumatic signal for operating a control member. In this instance the amplifying relay is shown connected by suitable conduit to a control valve 82 which is positioned within the line 84 adapted to carry the temperature controlling fluid. The control valve 82 may be of any suitable type such as a simple diaphragm valve in which the valve member is positioned by means of a pneumatic pressure acting upon the diaphragm.

The operation of the thermostatic unit and the entire system will now be described. Assuming that the system is operating in its heating cycle, the thermostatic unit will be connected to a source of 18 p.s.i. pressure. The pressure as reduced by the needle valve will have substantially little or no effect on the stream from the orifice 20 whereby such stream will be received into the passage 24a and in turn into the chamber 56. During equilibrium conditions when the temperature is at the desired level the ball valve member 68 will be positioned intermediate its opened and closed position whereby there will be a restricted bleed to atmosphere. This in turn will result in a stream of air flowing from the passage 52 in an intermediate amount so as to partially deflect the stream flowing from the orifice 38. Thus a portion of the stream from the orifice 38 will be received in the orifice 44 and a portion in the orifice 46. The part of the stream flowing into the orifice 46 will in turn be communicated to the amplifying relay 80 and since the equilibrium condition is present the relay 80 will not signal so as to change the position of the control valve 82. Should the temperature increase, whereby the thermostatic element 72 is deflected downwardly so that the ball valve member 68 is moved toward the seated position, the velocity of the stream 52 will be increased so that substantially all of the stream issuing from the orifice 38 will be directed into the orifice 46. This will cause an increased pressure to be communicated to the amplifying relay which will cause an appropriate signal to be communicated to the control valve 82 to correct for the increase in temperature.

Should the temperature decrease, the bimetal 72 will deflect outwardly so that the ball 68 will be spaced a greater distance from the seating position, whereby substantially all of the stream received in the chamber 56 will be bled to atmosphere, thereby substantially reducing the stream flowing through the orifice 52. This will permit substantially all of the stream flowing from the orifice 38 to flow into the orifice 44 and out the exhaust port 44a. As a result the signal to the amplifying relay 80 will be materially reduced so as to cause it to emit a pneumatic signal whereby the flow through the valve 82 will be increased thus correcting the decrease in temperature.

When the system is being operated for purposes of cooling, the thermostatic unit 10 will be connected to the source of supply pressure at 22 p.s.i. As described previously the stream from the orifice 20 will be deflected into the orifice 26 by the stream flowing from the passage 32. The bimetal 74 is reverse acting compared to the bimetal 72. Thus when an increase in temperature is sensed during the cooling cycle by the bimetal 74, the bimetal will deflect away from the thermostatic unit so that the ball valve 70 is moved into its open position. Conversely, when the bimetal 74 senses a decrease in temperature, the bimetal will deflect toward the thermostatic unit so that the ball valve 70 is moved toward its seated position. At the equilibrium condition, the chamber 58 is sufficiently open to atmosphere that the flow from the orifice 54 is only sufficient to bias the stream from the orifice 38 to an extent that it is partially received within the orifice 44 and partially within the orifice 42. Upon an increase in temperature, the bleed rate to atmosphere will be increased whereby substantially all of the stream from the orifice 38 is ported to atmosphere. This causes the amplifying relay 80 to emit a signal whereby the valve 82 is moved to a more open condition thus letting more cooling fluid flow through the system so as to correct the increase in temperature. Conversely, upon sensing a decrease in temperature the ball valve member 70 is moved toward its seated position whereby the stream flowing from the orifice 54 is increased to more fully bias the stream from the orifice 38 into the orifice 42. This in turn causes an increase in a signal to the amplifying relay 80 which in turn emits a signal so as to bias the valve 82 toward a closed position, thus reducing the flow of cooling fluid so as to correct the decrease in temperature.

It will be apparent that certain modifications may be made within the scope of the appended claims without departing from the spirit of the invention.

I claim:

1. In a temperature control system which is selectively operational in heating and cooling modes and which includes a control device for regulating the degree of heating or cooling during said operational modes, a fluid amplifier for providing an analog fluid signal, proportional to sensed temperature, to said control device, said amplifier comprising:

an inlet port adapted to be selectively connected to two sources of pressurized fluid, one at higher pressure than the other, the lower of said sources being employed during one of said operational modes, and the higher during the other;

a first orifice connected to said inlet port and adapted to discharge a first stream of said pressurized fluid;

second and third orifices adapted to selectively receive said first stream, said second orifice normally receiving said first stream and said third orifice receiving said first stream only when it is deflected;

first deflector means connected to said inlet port for directing a second stream of fluid to deflect said first stream to said third orifice only when said higher source of pressurized fluid is employed;

a fourth orifice connected to a source of pressurized fluid and adapted to discharge a third stream therefrom;

fifth, sixth and seventh orifices adapted to selectively receive said third stream, said sixth orifice normally receiving said third stream and said fifth and seventh orifices receiving said third stream only when it is deflected, said sixth orifice communicating with atmosphere and said fifth and seventh orifices communicating with said control device;

second deflector means connected to said second orifice for directing said first stream to deflect said third stream to said seventh orifice during said one of said operational modes; and third deflector means connected to said third orifice for directing said first stream to deflect said third stream to said fifth orifice during said other of said operational modes.

2. A system in accordance with claim 1, wherein said first deflector means includes adjustable means for varying the momentum of said second stream.

3. A system in accordance with claim 1, wherein each of said second and third deflector means includes means responsive to sensed temperature for varying the momentum of said first stream in a manner proportional to said sensed temperature.

4. A system in accordance with claim 3, wherein said temperature responsive means includes bleed means for bleeding a portion of said first stream to atmosphere.

5. A system in accordance with claim 4, wherein said bleed means is controlled by a bi-metallic element.

6. A fluid amplifier for providing a fluid signal proportional to either of two sensed conditions, one of which is of interest during a first operational mode and the other of which is of interest during a second operational mode, said amplifier comprising:
- an inlet port adapted to be connected selectively to two sources of pressurized fluid, one at a higher pressure than the other, the lower of said sources being employed during the first of said modes and the higher during the second;
- a first orifice connected to said inlet port and adapted to discharge a first stream of fluid;
- second and third orifices adapted to selectively receive said first stream, said second orifice normally receiving said first stream and said third orifice receiving said first stream only when it is deflected;
- first deflector means connected to said inlet port for directing a second stream of fluid to deflect said first stream to said third orifice only when said higher source is employed;
- a fourth orifice connected to a source of pressurized fluid and adapted to discharge a third stream therefrom;
- fifth, sixth and seventh orifices adapted to selectively receive said third stream, said sixth orifice normally receiving said third stream and said fifth and seventh orifices receiving said third stream only when it is deflected, said sixth orifice communicating with atmosphere and said fifth and seventh orifices being adapted to transmit said fluid signal;
- second deflector means connected to said second orifice for directing said first stream to deflect said third stream to said seventh orifice during the first of said modes; and
- third deflector means connected to said third orifice for directing said first stream to deflect said third stream to said fifth orifice during the second of said modes.

7. An amplifier in accordance with claim 6, wherein said first deflector means includes adjustable means for varying the momentum of said second stream.

8. An amplifier in accordance with claim 6, wherein each of said second and third deflector means includes means responsive to one of said sensed conditions for varying the momentum of said first stream in a manner proportional to said sensed condition.

9. An amplifier in accordance with claim 8, wherein said responsive means includes bleed means for bleeding a portion of said first stream to atmosphere.

References Cited
UNITED STATES PATENTS

| | | | |
|---|---|---|---|
| 3,144,309 | 8/1964 | Sparrow | 137—81.5 XR |
| 3,153,934 | 10/1964 | Reilly | 137—81.5 XR |
| 3,171,421 | 3/1965 | Joesting | 137—81.5 |
| 3,220,428 | 11/1965 | Wilkerson | 137—81.5 |
| 3,228,410 | 1/1966 | Warren et al. | 137—81.5 |
| 3,275,014 | 9/1966 | Plasko | 137—81.5 |
| 3,277,914 | 10/1966 | Manion | 137—81.5 |
| 3,313,313 | 4/1967 | Katz | 137—81.5 |
| 3,327,725 | 6/1967 | Hatch | 137—81.5 |
| 3,335,737 | 8/1967 | Gesell | 137—81.5 |

SAMUEL SCOTT, *Primary Examiner.*

U.S. Cl. X.R.

165—26; 236—1